March 18, 1924.
W. J. MOORE
COLLISION SCREEN
Filed Oct. 6, 1921
1,487,176
2 Sheets-Sheet 1
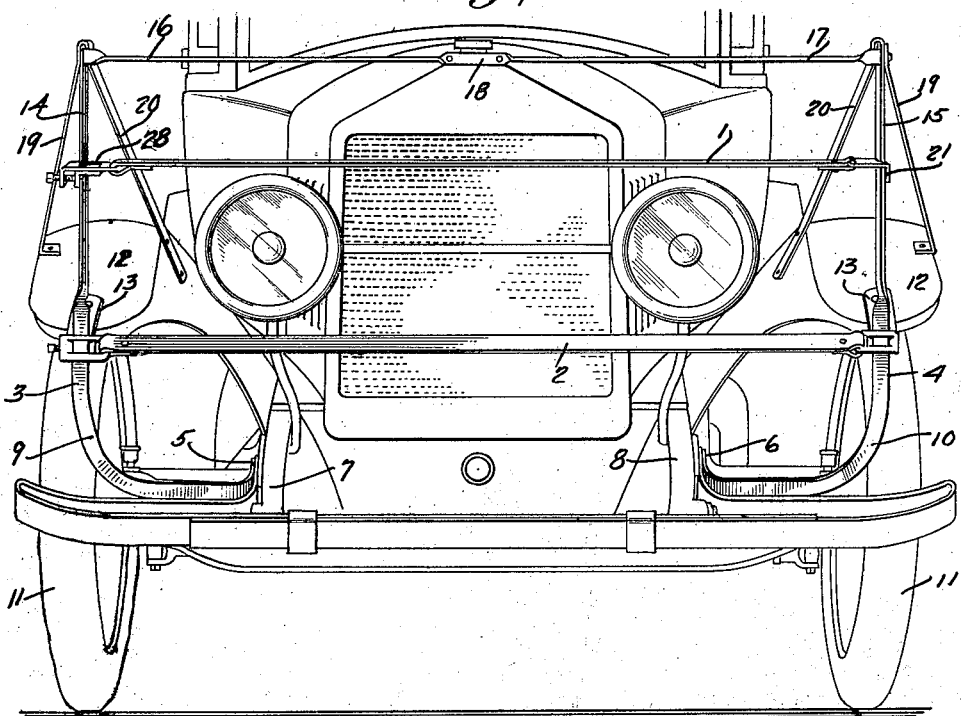
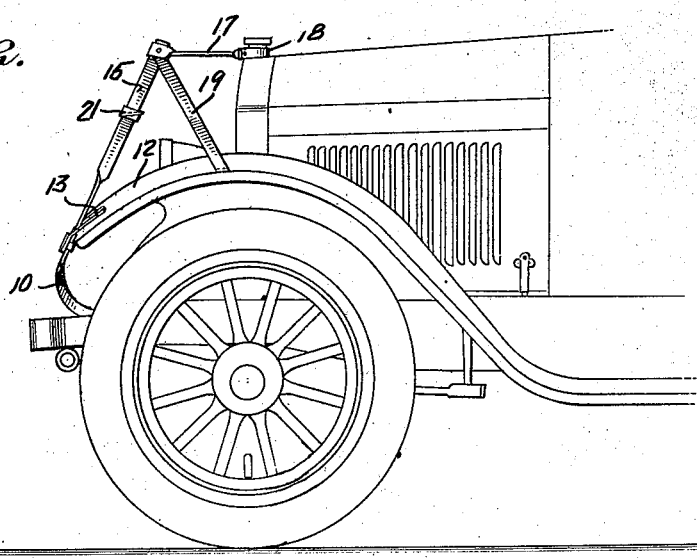
WITNESSES
INVENTOR
WALTER J. MOORE
BY
ATTORNEYS March 18, 1924.
W. J. MOORE
COLLISION SCREEN
Filed Oct. 6, 1921  2 Sheets-Sheet 2
1,487,176
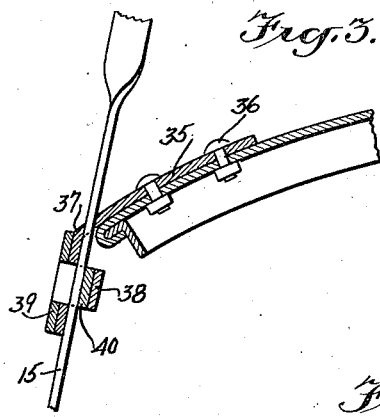
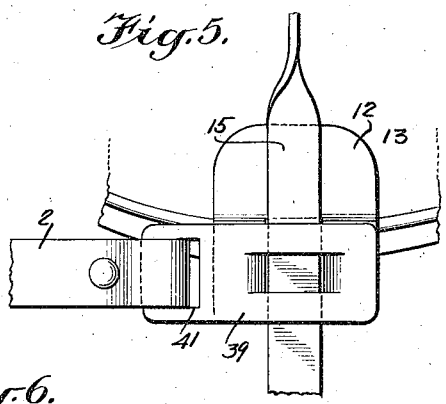
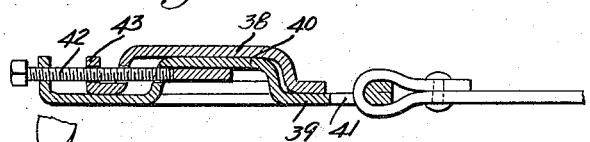
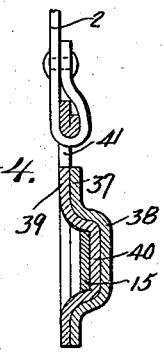
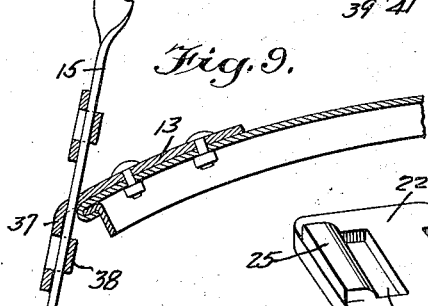
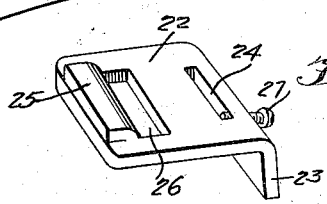
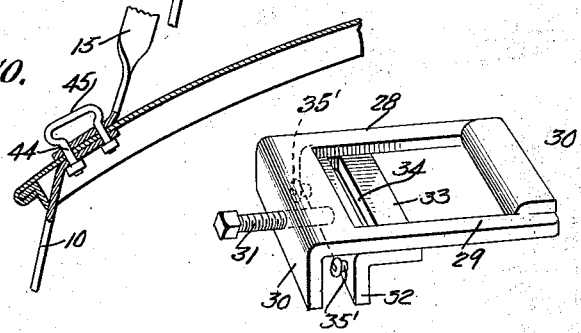
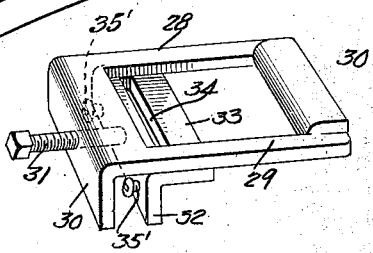
WITNESSES
INVENTOR
WALTER J. MOORE
BY
ATTORNEYS Patented Mar. 18, 1924.

1,487,176

UNITED STATES PATENT OFFICE.

WALTER J. MOORE, OF NEW YORK, N. Y.

COLLISION SCREEN.

Application filed October 6, 1921, Serial No. 505,835. Renewed May 23, 1922. Serial No. 563,124.

*To all whom it may concern:*

Be it known that I, WALTER J. MOORE, a citizen of the United States, and a resident of the city of New York, borough of Manhattan, in the county and State of New York, have invented a new and Improved Collision Screen, of which the following is a full, clear, and exact description.

This invention relates to a collision screen for automobiles, and has for an object the provision of a screen to be attached preferably to the front of an automobile to take the impact of the body of a person struck by the car or by the bumper of the car.

Another object resides in the provision of means whereby the screen can be made of strong but cheap stock material and is sufficiently flexible along those portions subject to the impact of a body to receive said body without seriously injuring it.

A further object resides in the provision of means whereby the frame can be readily attached to an automobile and whereby the various parts can be adjusted in different positions to conform to different types of cars.

A still further object resides in the provision of means whereby a screen and its supporting frame is rigidly mounted in connection with various fixed points on an automobile whereby the strength of the frame is considerably enhanced.

Another object resides in the particular construction and arrangement of parts which are hereinafter described and claimed and shown in the accompanying drawings.

The invention is illustrated in the drawings, of which—

Figure 1 represents the front of an automobile with the collision screen attached;

Figure 2 is a side view thereof;

Figure 3 is a vertical section showing the means for attaching the frame to the front tip of a mud guard;

Figure 4 is a horizontal section of the portion shown in Figure 3;

Figure 5 is a front view of the portion of the device shown in Figure 3;

Figure 6 is a horizontal section showing the manner of adjusting one of the parts of the screen;

Figures 7 and 8 are perspective views showing different types of clamps or brackets for the collision straps;

Figure 9 is a vertical section showing a modified form of adjustment means; and

Figure 10 is a still further modification in which the collision frame is permanently attached to the tip of the mud-guard.

The invention as illustrated in the drawings represents a preferred form and manner of application of my invention or device to an automobile, although it is to be understood that various mechanical changes in the construction and arrangement of parts and the kind of materials used can be adopted without departing from the spirit of the invention as set forth.

The main purpose of the invention is to provide a screen in front of an automobile, particularly disposed in front of the radiator and the lamps, so that if a person is struck by the automobile his body will not come in contact with the radiator and lamps, which would most likely do him serious injury even with little impact; whereas if there were a screen disposed in front of these surfaces to receive his body, and that screen were flexible, serious accidents might be avoided. This screen may be formed of any suitable materials, but as shown is preferably composed of a plurality of flexible straps such as 1 and 2 which extend across in front of the machine at different levels to receive the body of the person struck by the automobile. These straps may be of any suitable dimensions but are preferably flexible so that the screen has a certain amount of resiliency in receiving the body in order that the screen itself may not do serious injury to the person. These straps may be disposed across in front of the car at various levels and, as shown in Fig. 1, one of them No. 1, is disposed across at a level between the top of the lamps and the top of the radiator, and the other one, No. 2, is disposed across in front of the radiator slightly below the level of the lamps. It will be understood, of course, that the particular location of these straps is a matter largely dependent upon the type of car to which this screen is being applied and the relative disposition thereon of the lamps and the radiator. Consequently, the disposition of the straps is determined by the position of them which will give the most efficient service to effect the purpose above mentioned.

In order that these straps may be properly and strongly supported to receive the weight of the body portion thereon, I have provided a frame. This frame comprises two metal bars or pieces of metal tubing such as 3 and 4, which at their lower ends 5 and 6 are fastened in any suitable manner to the front portion of the car, as, for example, the chassis members 7 and 8. These frame members are formed into curved portions 9 and 10 so as to lie outside the arc of movement of the front wheels 11 as these wheels move in steering the automobile. The curved portions 9 and 10 function to strengthen the mud guard tips, to allow collision straps to be adjusted below the mud guard tips and to brace against lateral pull when shock of collision comes on the straps. They may be dispensed with when the mudguards are designed strong enough and long enough advanced beyond and below the lamps so that the collision straps may be mounted directly on the tips of the guards. The frame members 3 and 4 then extend upwardly and are connected to the tip of the mud-guards 12 by means of brackets such as 13, the detail construction of which will be hereinafter described. The frame members are adjustably received by these brackets but after being adjusted can be rigidly fixed therein. Above these brackets 13 the frame members 3 and 4 extend in the form of upright portions 14 and 15 which substantially from the mud-guards 12 upward are turned with their edges parallel to the length of the automobile or substantially in the line of sight of the driver so as not to obstruct the vision of the driver. In fact, the parts of this screen device which are within the vision of the driver of the car are preferably turned edgewise to the driver so as to avoid obstructing his vision more than is necessary. As shown in Fig. 2, these upright members 14 and 15 of the frame slope rearwardly from the tip of the mud-guards and the upper end of each of the frame members 14 and 15 is connected by tie bars such as 16 and 17 to the upper point of the radiator, preferably adjacent the cap. These tie bars 16 and 17 may be in any suitable manner connected to the frame members 14 and 15 and are fastened to the radiator by any suitable means, such as a clamping plate 18.

It will, therefore, be observed that this frame is rigidly disposed at three points, first, at its lower end to the automobile frame; secondly, at an intermediate point to the tip of the mud-guards; and, thirdly, is rigidly braced at the top of each frame member. By this construction or three-point reinforcement the frame is made very strong. Additional braces, bracing straps or tie members such as 19 and 20 may be attached at one end to the upper end of the frame members 14 and 15, the tie member 19 extending to the outside edges of the mud-guard and the tie member 20 sloping rearwardly and being connected at its lower end along the inner, rear face of the mud-guard. The tie members 16, 17, 19 and 20, therefore, form a sort of truss for supporting and rigidly reinforcing the frame members 14 and 15. The straps 1 and 2 at their ends are connected to suitable sliding and adjustable brackets whereby their levels may be determined. For instance, the right-hand end of the strap 1 is connected to a sliding bracket of the type shown in Fig. 7 and which I designate by the numeral 21. This bracket has a body portion 22 with a depending flange portion 23 adapted to lie along the outside of the frame member 15 and provided with a slot 24 through which the frame member or strap 15 extends. Adjacent one edge of the body portion 22 I provide a curved lip 25, and adjacent this lip is an aperture 26. The end of the strap is passed around the lip 25 and through the aperture 26, as shown in Fig. 1, and then the bracket 21 is slid along the frame member 15 to any desired position. A set screw such as 27 may be used to fasten the bracket 21 on the member 15, as desired. The other end of the strap 1 is receivable by a bracket 28 having an aperture 29 and a lip 30 over which that end of the strap is looped. The other end of the bracket 28 is provided with a dependent flange 30 and an adjusting set screw 31 the inner end of which bears against a flange 32 and a slidable plate 33 which has a slot 34 therein to receive the frame member 14 therethrough. The flange 32 may be provided with small set screws 35' to fix the plate 33 in any desired position on the frame member 14. The movement of the set screw 31, therefore, will tighten the strap 1 as desired or loosen it.

As heretofore mentioned, the frame members are connected to the front tip of each mud-guard by brackets 13. These brackets 13 comprise a body portion 35 which may be suitably fastened, as by bolts 36, to the tip of the mud-guard, and has a forwardly and downwardly extending portion 37 which extends forwardly and downwardly over the tip of the mud-guard at any desired incline, depending upon the slope it is desired to give to the frame supporting the collision straps. This downwardly extending portion of the bracket is provided with two longitudinal slits and having the portion 38 between said slits depressed to form an opening for the passage of the frame member 15. Over this depending portion of the bracket there is adapted to be placed a plate 39 having a split depressed portion 40 adapted to lie in a depression formed by the depression of the portion 38 of the bracket. As shown in Fig. 3, the portions 38 and 40 are relatively depressed a sufficient distance so that when placed together the frame members, such as 14 and 15, can be disposed between them and the downwardly depressed portion 37 on the front of the bracket. The inner end of the plate 39 is provided with an aperture 41 through which the end of the collision strap is looped. At the other end of the collision strap, preferable strap 2 as shown in Fig. 1, the strap is looped through a similar aperture 41 in the plate 39. This plate 39 has a depressed portion 40 adapted to lie against a depressed portion 38 of a dependent portion such as 37 of another bracket 13. However, at this end of the strap 2 the plate 39 is provided with an adjustable set screw 42 adapted to engage suitable apertures in a flange 43 on the portion 37 of the bracket 13 so that the movement of the screw will cause the plate 39 to be moved laterally relative to the dependent portion 37 to tighten or loosen the strap in accordance with the movement of the set screw in one direction or the other.

As shown in Fig. 9, a frame member, such as 15, is shown passing through the lower end of a bracket 13, but in this case the plates 39 to which the collision straps are fastened are not intimately related with the plate or dependent portion 37 but are adjusted either below or above the same as desired. To dispose these straps along the frame member 15 or below the mud-guard is desirable in certain types of cars and is dependent upon the position of the elements of the particular car to which the screen is being attached.

In Fig. 10 I have shown the lower end of the frame member, such as 15, as being rigidly bolted as at 44 to the mud-guard. These bolts as shown form part of an anchor 45 to which the collision strap may be attached. In other words, in this construction the lower portions 9 and 10 of the frame members may be dispensed with and the collision strap anchored independently of the frame anchor if desired. In some types of cars the means of fastening the frame 15 as is shown in Fig. 10 may be used, in which case the bracket 13 would be attached to the mud-guard tip in order to support the collision strap properly.

From a consideration of the above description it will, therefore, be seen that I have provided a simple, economically manufactured, strong collision screen which can be very readily applied to any car either during the process of manufacturing the car or after the car has been built, and in which the various collision straps or body receiving members may be adjusted at will to suit the type of car or the particular circumstances of each case. By reason of the fact that various types of cars will require various modifications in the arrangement and construction of the parts it will be understood that these may be made while still involving the main principle of the invention as set forth.

Having thus described my invention, I claim:

1. A collision screen for automobiles which comprises a frame rigidly connected to the automobile at the front portion thereof and a plurality of collision straps disposed substantially horizontally on said frame, said straps disposed definitely with relation to the radiator and the lamps of the automobile and means adjustably connecting the straps to the frames.

2. A frame member for a collision screen for automobiles which comprises a metallic member fastened at one end to the chassis of the automobile, a clamp bracket mounted on the tip of the mud guard of the automobile, means for adjustably connecting the frame member to this bracket, said frame member extending in a smooth curve between the mud guard and the chassis member to clear the arc of travel of the automobile wheel, a bracing member connected to the mud guard at one end and at the other end to the upper end of the frame member which extends upwardly and rearwardly from the tip of the mud guard.

3. A frame member for a collision screen for automobiles which comprises a metallic member fastened at one end to the chassis of the automobile, a clamp bracket mounted on the tip of the mud guard of the automobile, means for adjustably connecting the frame member to this bracket, said frame member extending in a smooth curve between the mud guard and the chassis member to clear the arc of travel of the automobile wheel, a bracing member connected to the mud guard at one end and at the other end to the upper end of the frame member which extends upwardly and rearwardly from the tip of the mud guard and means extending from the upper end of the frame member to the top of the radiator to additionally brace the frame member.

4. A frame member for a collision screen for automobiles which comprises a metallic member fastened at one end to the chassis of the automobile, a clamp bracket mounted on the tip of the mud guard of the automobile, means for adjustably connecting the frame member to this bracket, said frame member extending in a smooth curve between the mud guard and the chassis member to clear the arc of travel of the automobile wheel, a bracing member connected to the mud guard at one end and at the other end to the upper end of the frame member which extends upwardly and rearwardly from the tip of the mud guard and a collision strap extending across the front of the automobile and means adjustably connecting the collision strap to the frame member.

5. A collision screen for automobiles which comprises a pair of metallic frame members each connected at one end to the chassis extending in a smooth curve to avoid the arc of movement of the wheel to the tip of the mud guard, an adjustable bracket disposed on each mud guard and means for adjustably connecting the frame member to said bracket, each frame member extending upwardly and rearwardly over the mud guard, bracing members connected to the mud guard and to the upper end of each frame member and additional bracing members connected from the top of the radiator to the top of each frame member.

6. A collision screen for automobiles which comprises a pair of metallic frame members each connected at one end to the chassis extending in a smooth curve to avoid the arc of movement of the wheel to the tip of the mud guard, an adjustable bracket disposed on each mud guard and means for adjustably connecting the frame member to said bracket, each frame member extending upwardly and rearwardly over the mud guard, bracing members connected to the mud guard and to the upper end of each frame member and additional bracing members connected from the top of the radiator to the top of each frame member and collision straps extending across the front of the automobile between the frame members.

7. A collision screen for automobiles which comprises a pair of metallic frame members each connected at one end to the chassis extending in a smooth curve to avoid the arc of movement of the wheel to the tip of the mud guard, an adjustable bracket disposed on each mud guard and means for adjustably connecting the frame member to said bracket, each frame member extending upwardly and rearwardly over the mud guard, bracing members connected to the mud guard and to the upper end of each frame member and additional bracing members connected from the top of the radiator to the top of each frame member and collision straps extending across the front of the automobile between the frame members, said collision straps disposed in horizontal lines above and below the lamps and with definite relation to the protection of the body adapted to be received thereby.

8. A collision screen for automobiles which comprises a pair of metallic frame members each connected at one end to the chassis extending in a smooth curve to avoid the arc of movement of the wheel to the tip of the mud guard, an adjustable bracket disposed on each mud guard and means for adjustably connecting the frame member to said bracket, each frame member extending upwardly and rearwardly over the mud guard, bracing members connected to the mud guard and to the upper end of each frame member and additional bracing members connected from the top of the radiator to the top of each frame member and collision straps extending across the front of the automobile between the frame members, collision straps extending between the frame members and means for adjusting the collision straps on the frame members at any desired level and with respect to the radiator and the lamps of the automobile.

9. A collision screen for automobiles, which comprises a supporting frame disposed across the front of the automobile, and a plurality of flexible collision straps disposed substantially horizontal on said frame and extending in front of the automobile, said straps and frame members wherever disposed in the line of vision of the driver of the car being turned edgewise to prevent obstruction of the driver's vision.

10. A collision screen for automobiles, which comprises a pair of metallic members fastened at the following points: first, at the lower end; second, at the intermediate point to the tip of the mud-guard; and third, at the upper end suitably braced to form a frame; and a plurality of collision straps extending between said frame members across the front of the automobile.

11. A collision screen for automobiles, which comprises a supporting frame disposed across the front of the automobile, and a plurality of flexible collision straps disposed substantially horizontal on said frame and extending in front of the automobile, said screen sloping rearwardly from a vertical plane.

12. A collision screen for automobiles, which comprises a pair of metal members each connected at the front end of the mud-guard of the automobile, extending thence upwardly and rearwardly, and a bracing connection at the upper end to form a frame, said members supporting a plurality of collision straps which extend across between the members, certain of said straps extending from one mud-guard to the opposite mud-guard, and certain other of said straps being mounted directly on the guard or on an extension of the guard below and forward of the lower plane of the automobile lamp.

13. A collision screen for automobiles, which comprises a pair of metallic frame members which extend upwardly and rearwardly on each side of the machine and are suitably connected thereto at a plurality of points, and a plurality of collision straps extending across between said frame members to receive the body of a person struck by an automobile, one of said collision straps extending across from the top of one mud-guard to the top of another mud-guard and being fastened directly thereto.

14. A collision screen for automobiles which comprises a supporting frame disposed across the front of the automobile and secured to the radiator and a plurality of flexible collision straps disposed at different levels and substantially horizontal on said frame and extending in front of the automobile, said straps being of greater width than thickness and disposed with the greater dimension extending longitudinally of the automobile.

15. A collision screen for automobiles which comprises a pair of metallic members each connected at one end to the chassis of the automobile, at an intermediate point to the tip of the mud guard, and at an upper end suitably braced to form a frame and a plurality of collision straps extending between said frame members across the front of the automobile.

16. A collision device for automobiles, which comprises a supporting frame disposed across the front of the automobile and secured to the radiator, and a collision screen supported on said frame in front of the automobile.

17. A collision device for automobiles, which comprises a supporting frame disposed across the front of the automobile and secured to the radiator, and a collision screen supported on said frame in front of the automobile, said screen sloping rearwardly from a vertical plane.

18. The combination with an automobile of a collision screen therefor which comprises a frame connected to the automobile at the front portion thereof, said frame comprising members of greater width than thickness and disposed with the greater dimension extending longitudinally of the automobile whereby the least dimension of said members will be presented to the view of the driver, and means extending between the said frame members across the front of the automobile for receiving a person struck.

19. The combination with an automobile of a collision screen therefor which comprises a frame connected to the automobile at the front thereof and a plurality of collision members mounted upon said frame and extending across the front of the automobile, said members being of greater width than thickness and having their greater dimensions extending longitudinally of the automobile whereby the least dimension is presented to the view of the automobile driver.

20. The combination with an automobile having mud guards on opposite sides of the vehicle, a protective device for persons struck extending between and connected with said mud guards and a collision bumper disposed across the vehicle below said device, said bumper being separate from and forward of said device whereby objects struck will contact with said bumper before the protective device.

WALTER J. MOORE.